Aug. 4, 1964    S. SOFIO    3,143,059
HOLDER FOR STEAMING STUFFED ARTICHOKES
Filed Feb. 5, 1959    2 Sheets-Sheet 1
Fig. 1
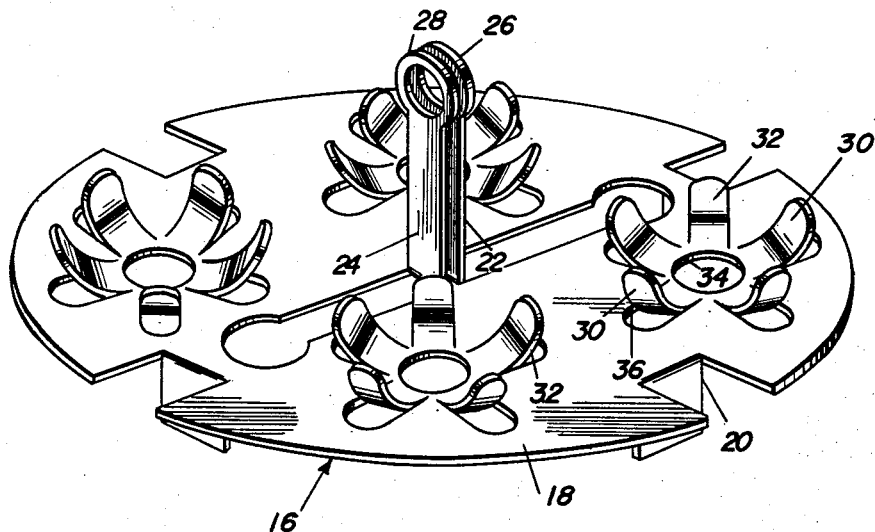
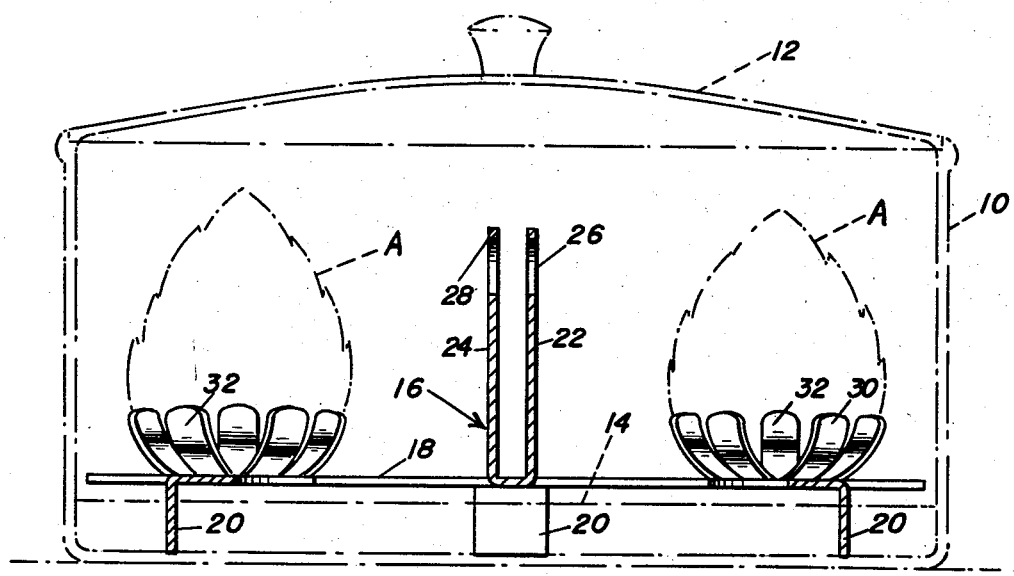
Fig. 2
Sebastian Sofio
INVENTOR.

Aug. 4, 1964 S. SOFIO 3,143,059
HOLDER FOR STEAMING STUFFED ARTICHOKES
Filed Feb. 5, 1959 2 Sheets-Sheet 2

Sebastian Sofio
INVENTOR.

BY
Attorneys

United States Patent Office 3,143,059
Patented Aug. 4, 1964

3,143,059
HOLDER FOR STEAMING STUFFED ARTICHOKES
Sebastian Sofio, 1519 Independence St., New Orleans, La.
Filed Aug. 5, 1959, Ser. No. 831,812
7 Claims. (Cl. 99—440)

This invention relates to cooking utensils and more particularly to a holder to retain stuffed artichokes while they are being steamed.

An object of the invention is to provide a special purpose cooking utensil specifically constructed and arranged to support stuffed artichokes in an erect position while they are being steamed.

To my knowledge there is no prior disclosure of an implement which is constructed as the holder in accordance with this invention. One of the very important features of the invention is the ease and facility with which the artichokes may be handled prior to, during and after steaming and yet, they are retained in an orderly fashion without loss of leaves or any portion thereof. Further, the stuffing in the artichokes is maintained properly in place and yet exposed to a quantity of steam so that there is a thorough, even and highly satisfactory cooking of the artichokes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of one form of the holder.

FIGURE 2 is a longitudinal sectional view of the holder of FIGURE 1, a typical steaming pot shown in dotted lines around the holder.

Figure 3:
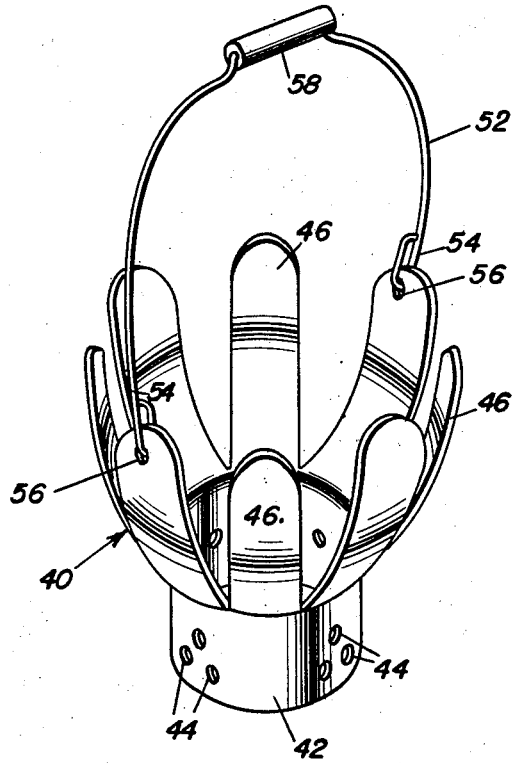
FIGURE 3 is a perspective view of a simpler form of the invention.

In the accompanying drawings reference is first made to FIGURES 1 and 2. A conventional pot 10 is shown with lid 12. This pot is used for steam and therefore a water level 14 is illustrated. Holder 16 is adapted to be mounted in steaming pot 10 to retain artichokes A in an upright position above water level 14 and in an orderly fashion so that the steam generated in the pot will flow upwardly, in, through and around the artichokes A that are supported in holder 16.

Structurally, the holder is made of a lightweight flat metal disk or plate 18 which forms a base. A plurality of legs 20 are struck from the peripheral portion of the base and they depend from the main surface of the base and are adapted to seat on the bottom of the pot 10. Legs 20 hold the base 18 elevated above the water level so that steam only will flow upwardly toward artichokes A.

Two handles 22 and 24, formed by tongues struck from the material of base 18, rise upwardly from the center of the base. The handles may be rigid with the base or hinged thereto by means of a simple hinge connection. It is preferred that the handles have rings 26 and 28 at the upper ends thereof to facilitate lifting the holder from pot 10 by either hand or by inserting a knife, fork, spoon, etc. through the apertures of the rings.

A plurality of sockets 30 are formed in base 18 and each is adapted to accommodate a single artichoke. Each socket is formed by a plurality of curvilinear, substantially radial fingers 32 preferably struck from the material of base 18 and forming an approximately or at least partially spherical socket. There is a central opening 34 in each socket through which steam may pass. The apertures 36 remaining in base 18 after fingers 30 are struck therefrom, also provide space through which steam may pass to flow up and down artichokes A.

Figure 4:
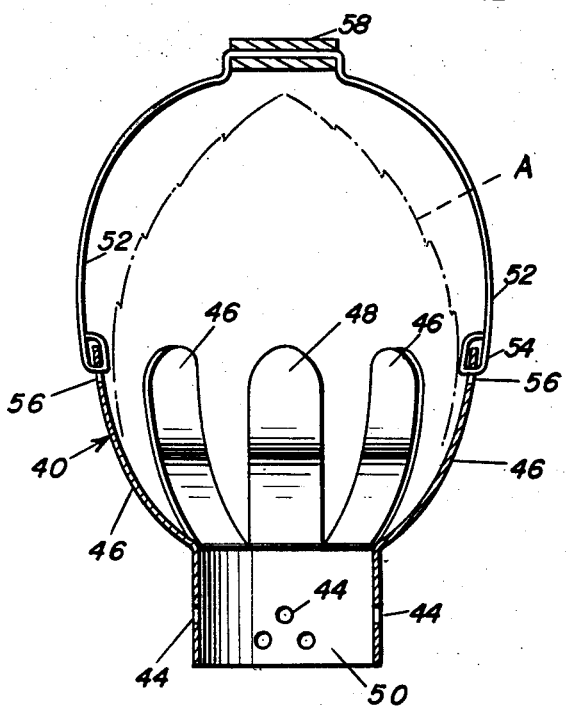
FIGURE 4 is a cross-sectional view of the holder in FIGURE 3.

Attention is now invited to FIGURES 3 and 4. Holder 40 shown in these figures is a single artichoke A holder and may simply be rested within a steamer e.g. pot 10. Holder 40 has a base 42 made in the form of a collar with a plurality of steam passage openings 44 in the side wall thereof. Fingers 46 are curved approximately the same as fingers 32 in order to form socket 48, and the central opening 50 in socket 48 is formed by and coincident with the bore of collar 42.

In both forms of the invention the fingers may be bendable, for example, if the holders are made of a bendable metal such as aluminum whereby the artichokes of different sizes may be made to fit snugly in the sockets by simply enlarging or reducing the size of the socket by bending the fingers. It is preferred that holder 40 be equipped with a handle to facilitate lifting and lowering the holder. Handle 52 is made in the form of a wire bail with loops 54 at the ends thereof and engaged in apertures 56 in two of the fingers 46. A heat insulating hand-grip 58 is mounted at the center of the bail to prevent burning one's fingers or hand when lifting the hot artichoke from the steamer pot.

In use and operation, the artichokes are stuffed and nested snugly in the sockets of holder 16 or holder 40 depending on whether a single artichoke is to be steamed or a plurality of artichokes steamed at the same time. The steam flows upwardly through the aperture at the bottom of the socket and flow in a manner to thoroughly steam the artichoke properly. There is sufficient support for the artichoke exerted by the fingers of each socket to hold the artichoke and its stuffing, when stuffing is used, properly supported and as one integral mass during the complete cooking operation.

In view of the ornamental appearance of holder 16 and/or 40, the holders can be used as serving devices for the artichokes without having to remove the artichokes therefrom.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an artichoke holder, the combination of a base, a plurality of sockets on said base, each socket consisting essentially of a plurality of radial fingers struck from said base and rising and curving upwardly from the upper surface thereof to form a partially spherical socket within which to retain the artichoke.

2. In an artichoke holder, the combination of a base, a plurality of sockets on said base, each socket consisting essentially of a plurality of radial fingers struck from said base and rising and curving upwardly from the upper surface thereof to form a partially spherical socket within which to retain the artichoke, said base having a plurality of apertures, one of said apertures being at the bottom of each socket through which steam is adapted to pass, and additional apertures adjacent to the fingers and in said base through which additional steam is adapted to pass.

3. The combination of claim 2 wherein there is a handle connected with said base by which to lift and lower the base.

4. The combination of claim 2 wherein there are a plurality of legs depending from said base for supporting the base above the liquid level in a steamer.

5. An artichoke steamer comprising a circular, horizontal metallic plate, circumferentially spaced supporting legs struck downwardly from the marginal portion of said plate, a pair of carrying handles struck upwardly and inwardly from the plate, and a plurality of spaced sockets on said plate for receiving and holding artichokes in slightly elevated position above said plate, each of said sockets comprising a plurality of radiating, upwardly and outwardly curved fingers providing a seat for an artichoke, said fingers being bendable for adjusting the socket for artichokes of various sizes, said plate having circular openings therein located centrally of the sockets and communicating therewith for the passage of steam to and around the artichokes.

6. An artichoke steamer comprising a circular, horizontal metallic plate, circumferentially spaced supporting legs struck downwardly from the marginal portion of said plate, a pair of carrying handles struck upwardly and inwardly from the plate, and a plurality of spaced sockets on said plate for receiving and holding artichokes in slightly elevated position above said plate, each of said sockets comprising a plurality of radiating, upwardly and outwardly curved fingers providing a seat for an artichoke, said fingers being bendable for adjusting the socket for artichokes of various sizes, said plate having circular openings therein located centrally of the sockets and communicating therewith for the passage of steam to and around the artichokes, said fingers further being spaced from each other for the passage of the steam therebetween and still further being upwardly struck from the plate for providing additional openings for the passage of steam.

7. An artichoke steamer comprising a horizontal plate, and a socket on the plate for receiving and holding an artichoke in slightly elevated position above said plate, said socket including a plurality of radiating, outwardly and upwardly curved fingers defining a seat for the artichoke, said plate having an opening therein concentric with the fingers for passage of steam to and around the artichoke, said fingers being bendably adjustable for varying the size of the socket for accommodating artichokes of different sizes, said fingers further being upwardly struck from the plate for providing additional openings for the passage of steam.

References Cited in the file of this patent

UNITED STATES PATENTS

| | | |
|---|---|---|
| 1,184,811 | Berger | May 30, 1916 |
| 1,500,544 | Brockley | July 8, 1924 |
| 2,807,701 | Conlin et al. | Sept. 24, 1957 |

FOREIGN PATENTS

| | | |
|---|---|---|
| 1,083,798 | France | June 30, 1954 |